(12) United States Patent
White

(10) Patent No.: US 6,978,278 B2
(45) Date of Patent: Dec. 20, 2005

(54) SYSTEM AND METHOD FOR HETEROGENEOUS CACHING

(75) Inventor: Seth White, San Francisco, CA (US)

(73) Assignee: BEA Systems, Inc., San Jose, CA (US)

( * ) Notice: Subject to any disclaimer, the term of this patent is extended or adjusted under 35 U.S.C. 154(b) by 511 days.

(21) Appl. No.: 10/340,067

(22) Filed: Jan. 10, 2003

(65) Prior Publication Data

US 2003/0167377 A1     Sep. 4, 2003

Related U.S. Application Data

(60) Provisional application No. 60/349,577, filed on Jan. 18, 2002.

(51) Int. Cl.$^7$ ............................................. G06F 12/00
(52) U.S. Cl. ........................ 707/103; 707/10; 707/100; 707/103 Z; 709/203; 709/218; 709/246; 717/103; 717/147; 717/148
(58) Field of Search ...................... 707/10, 100, 103 Z, 707/103; 709/218, 203, 246; 717/103, 107, 717/147, 148

(56) References Cited

U.S. PATENT DOCUMENTS

| | | | |
|---|---|---|---|
| 6,513,040 B1 | 1/2003 | Becker et al. ................. | 707/10 |
| 6,567,809 B2 * | 5/2003 | Santosuosso .................. | 707/10 |
| 6,591,272 B1 * | 7/2003 | Williams ..................... | 707/102 |
| 6,842,758 B1 * | 1/2005 | Bogrett ....................... | 707/100 |
| 2002/0138582 A1 | 9/2002 | Chandra et al. | |
| 2002/0188591 A1 | 12/2002 | Santosuosso | |
| 2003/0028682 A1 * | 2/2003 | Sutherland .................. | 709/315 |

OTHER PUBLICATIONS

U.S. Appl. No. 10/340,023, filed Jan. 10, 2003, White.
U.S. Appl. No. 10/340,301, filed Jan. 10, 2003, White.

* cited by examiner

*Primary Examiner*—Donald Sparks
*Assistant Examiner*—Ngoc V. Dinh
(74) *Attorney, Agent, or Firm*—Fliesler Meyer LLP

(57) ABSTRACT

The caching of heterogeneous bean sets has been improved from requiring each bean to have its own cache instance to caching the beans in a single cache. The beans can be identified by generating a unique identifier that is a combination of the bean's primary key and a self-reference identifier of the bean manager associated with that bean. The average size of a bean set associated with a bean manager can be specified such that the cache allocates memory for that set based on the average size. A callback interface can also be used to shift knowledge of a bean life cycle back to the bean manager.

This description is not intended to be a complete description of, or limit the scope of, the invention. Other features, aspects, and objects of the invention can be obtained from a review of the specification, the figures, and the claims.

26 Claims, 3 Drawing Sheets

SYSTEM AND METHOD FOR HETEROGENEOUS CACHING

CLAIM OF PRIORITY

This application claims priority from U.S. Provisional Patent Application No. 60/349,577 entitled "SYSTEM AND METHOD FOR HETEROGENEOUS CACHING" by White, et al. filed Jan. 18, 2002, incorporated herein by reference.

COPYRIGHT NOTICE

A portion of the disclosure of this patent document contains material which is subject to copyright protection. The copyright owner has no objection to the fascimile reproduction by anyone of the patent document of the patent disclosure, as it appears in the Patent and Trademark Office patent file or records, but otherwise reserves all copyright rights whatsoever.

CROSS REFERENCE TO RELATED PATENT DOCUMENTS

The following co-pending U.S. patent documents are assigned to BEA Systems, Inc., the assignee of the present application, and these documents are hereby incorporated herein by reference:

(A) U.S. patent application Ser. No. 10/340,301 filed Jan. 10, 2003, to Seth White et al. and entitled, "System and Method for Read-Only Bean Caching";and (B) U.S. patent application Ser. No. 10/340,023 filed Jan. 10, 2003, to Seth White et al. and entitled, "System and Method for Optimistic Caching".

FIELD OF THE INVENTION

The invention relates to the caching of data and data objects.

BACKGROUND

Many systems that use entity beans to hold instances of data for an application will generate a separate cache for each entity bean. It is then necessary to configure each of these caches. Utilizing separate caches can lead to problems with memory fragmentation. Further, users can set limits on the size of these individual caches such that the system may be unable to use all available memory. For example, one of the entity beans might be very busy and require a lot of memory, while other beans sit idle. If the caches are configured to accommodate the busiest bean, the unused beans will have large cache allocations that will not be utilized, thereby wasting memory.

BRIEF SUMMARY

Systems and methods in accordance with embodiments of the present invention can utilize key identifiers to differentiate beans associated with different bean managers that might have a common primary key. In the system a bean, such as an entity bean, session bean, or Enterprise JavaBean (EJB), can be associated with data and have a primary key. A system can utilize a cache for caching the bean. A bean manager can be associated with the bean and the cache. The bean manager can have a self-reference identifier. A key identifier can be generated to identify the bean in the cache. The key identifier can be made up of a combination of the primary key and the self-reference identifier.

Systems and methods in accordance with embodiments of the present invention can handle a first bean manager that is associated with beans of a first size on average, as well as a second bean manager that is associated with beans of a second size on average. A cache associated with the bean managers can cache both sizes of beans, allocating cache memory for each type of bean based on the average size of that type of bean.

Other systems and methods in accordance with embodiments of the present inventions can shift all knowledge of the life cycle of a bean from the cache to the bean manager. A bean holding a data instance can be cached in a system cache. A bean manager associated with the bean can manage the life cycle of the bean. A callback interface associated with the cache can allow the cache to make callbacks on the bean manager that are related to the bean, such as callbacks involving notification events, for example.

Other features, aspects and objects of the invention can be obtained from a review of the specification, the figures, and the claims.

DETAILED DESCRIPTION

Systems and methods in accordance with one embodiment of the present invention utilize a common cache to cache entity beans. One example allows a J2EE application to share a single runtime cache for multiple entity bean deployments. Allowing beans to share a cache can reduce the amount of allocated, but unused, system memory. Such a cache can be managed using a common resource algorithm. In one embodiment, a common resource algorithm allows a user to manage cache by allocating the whole cache to a single bean or by allocating cache based on the demand of individual beans. This approach can allow for a more intelligent management of memory.

One problem to be overcome in introducing such a shared cache involved the need to uniquely identify beans in the cache. In a homogeneous set of beans, or a set of beans that all refer to a single data table, for example, the primary key of each bean can be used as an identifier. When a heterogeneous set is used, which may contain beans representing data in multiple data tables or databases, there can be beans in the cache that have a common primary key. In a simple example, the first item in table A and the first item in table B might each have a primary key value of "1".

In order to allow for heterogeneous sets, but still utilize primary keys as identifiers, embodiments in accordance with the present invention can attach an additional object or identifier to the primary key that is put into the cache. Other approaches are possible, such as creating different caches for each data source so there will be no overlap of primary keys.

Figure 1:
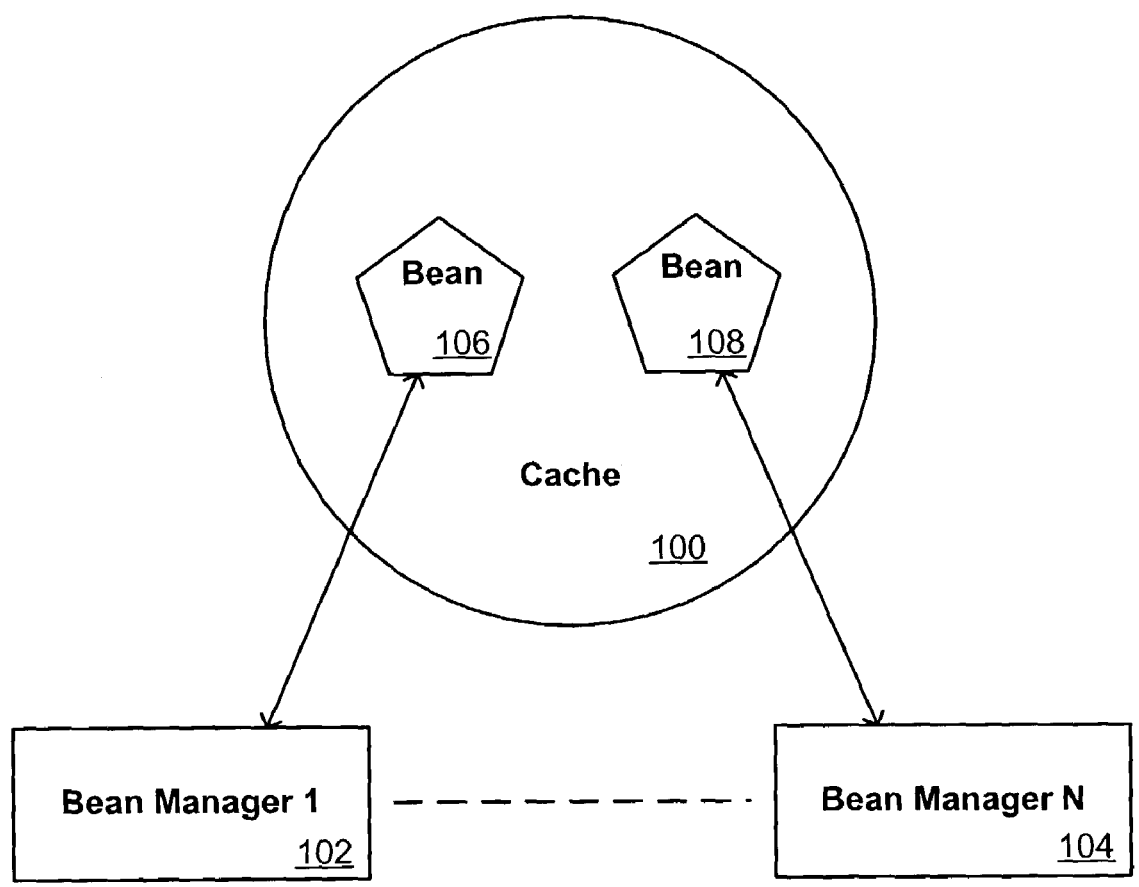
FIG. 1 is a diagram of a system in accordance with one embodiment of the present invention.

For a given cache, beans can be included that are associated with different bean managers. As shown in FIG. 1, cache 100 is associated with bean manager 102 and bean manager 104. The cache 100 manages the caching of the bean manager objects, which in turn manage the life cycle of the beans. Managing the life cycle can include tasks such as creating, removing, loading, and storing the beans. In FIG. 1, bean manager 102 is using cache 100 to cache its beans, such as bean 106. There can be any number of bean managers associated with a cache. Cache 100 can hold the physical instances of each type of bean in its own internal data structure.

In response to life cycle events, each bean manager can make service requests on the cache. For instance, a bean manager can inform the cache ahead of time if, for example, the bean manager creates a new bean. Before the bean manager can put something into the cache, however, the bean manager has to provide the cache with a key that uniquely identifies that bean in the cache. In one embodiment, the bean manager includes a self-reference in the key. For instance, if bean manager 102 has a bean 106 with primary key "1" and bean manager 104 has a bean 108 with primary key "1", bean manager 102 could cache the bean with a new primary key of "1102" and bean manager 104 could cache the bean with a new primary key of "1104". In this way, each bean retains its primary key value of "1" and maintains its unique identity by including a reference to the appropriate bean manager. The new key can be, for example, a Java class that encapsulates the primary key of the bean plus a new object that refers to the bean manger. The cache can use this new key to make callbacks on the appropriate bean managers.

Figure 2:
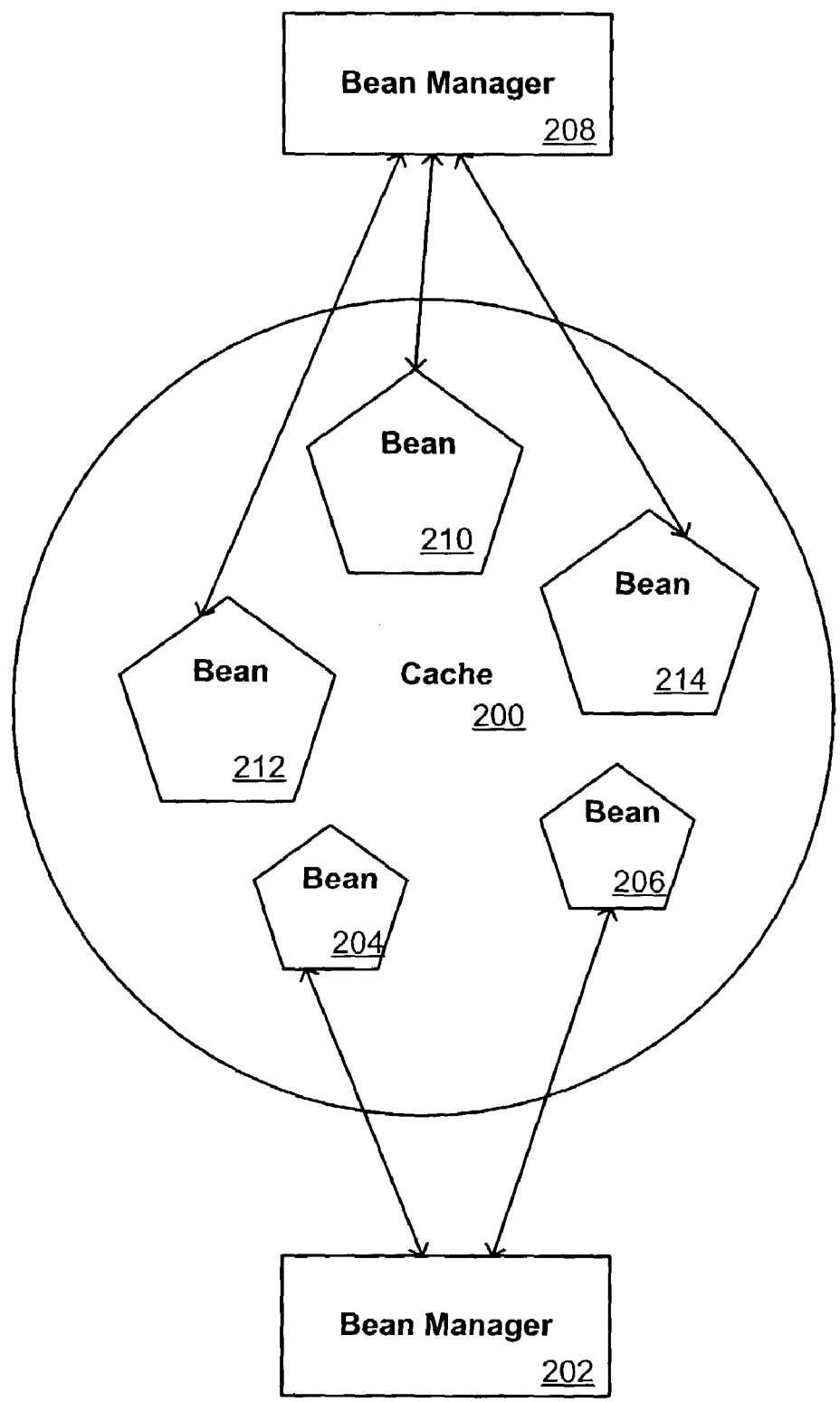
FIG. 2 is a diagram of a system in accordance with another embodiment of the present invention.

The ways in which resource limits can be specified for the cache are also an improvement over current systems. Presently, a user specifies a maximum number of beans in a cache. In accordance with one embodiment of the present invention, as shown in FIG. 2, a user can specify that beans have an average size for a particular bean manager. For example, the beans 204, 206 stored in cache 200 for bean manager 202 have the same average size, and the beans 210, 212, 214 for bean manager 208 have the same average size, which is larger than the average size for bean manager 202. The cache 200 can then manage beans according to the relative average size for each bean manager. This allows the cache to manage beans more intelligently, as beans from different bean managers can have drastically different sizes and requirements. For instance, one bean might represent customer data and another bean might represent order information.

Figure 3:
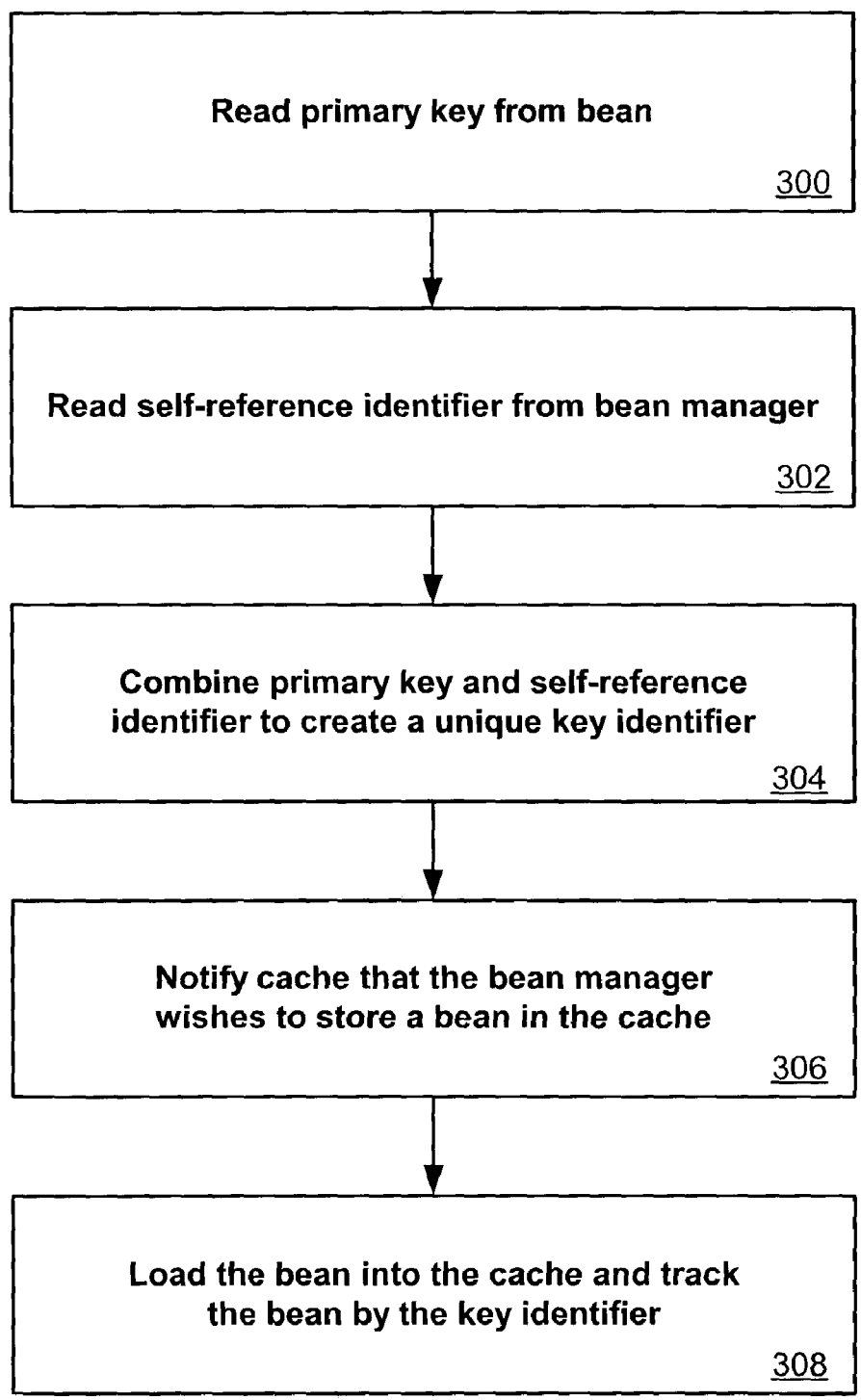
FIG. 3 is a flowchart showing the steps of a method in accordance with the embodiment of the FIG. 1.

FIG. 3 shows a method for caching a bean by key identifier. First, the primary key associated with a bean is determined 300. Then, the self-reference identifier of the associated bean manager is read 302. The primary key and self-reference identifier are then combined to form a unique key identifier 304. The bean manager notifies the caches that a bean is to be cached that corresponds to that key identifier 306. The bean is then loaded into the cache, which tracks the bean by the key identifier 308.

Many systems require a cache to have some knowledge of the life-cycle of a bean so the cache can call the life cycle methods on the beans themselves. This is difficult if the cache has to manage different types of beans. In accordance with one embodiment of the present invention, a cache can use a callback interface to make callbacks on a bean manager. A callback interface can be an event-driven method that points the cache in the proper direction for a bean without a bean having to have any knowledge of what exists outside the cache. Here, the bean manager can retain all bean-specific knowledge and information. The cache can simply inform the bean manager that something needs to be done, and does not have to worry about the life cycle of a bean.

For example, a prior art system would call methods on a bean that are defined by the EJB specification before the cache could evict a bean, as the bean might be keeping a cache state or open resource to other things. In one embodiment in accordance with the present invention, the cache can simply give a notification event to the bean manager saying that a bean is about to be evicted and the bean manager can worry about whether something needs to be done before the bean is evicted.

To configure application level cache, a user can make an entry in an application level deployment descriptor. A deployment descriptor is a file that indicates to an EJB server which classes make up the bean implementation and interfaces, as well as how EJBs interact if there is more than one EJB in a package. Certain elements can be used in an application level deployment descriptor to support heterogeneous entity bean caching. For example, a deployment descriptor, such as an XML file, can include the root element containing the name of the descriptor.

Another element that can be included is an "ejb" element that is specific to the EJB modules of the application. An "entity cache" element can be used to define a named application level cache that caches entity ejb instances at runtime. Individual entity beans can specify the cache that they want to use through the name of the cache. There may be no restriction on the number of entity beans that reference an individual cache.

Other elements can include, for example, an element specifying a unique name for an entity bean cache, the name being unique within an ear (enterprise archive) file. An element specifying the maximum number of beans in the cache can be included, such as "max-beans-in-cache", which specifies a limit on the size of an entity bean cache in terms of memory size, such as may be expressed in bytes or megabytes. An EJB container can attempt to estimate the amount of memory used by each entity bean in the cache, and limit the number of beans in the cache based on these estimates. Alternatively, a user can provide such estimates. An element can also be included that specifies the maximum cache size.

Another element that can be used is a "read-timeout-seconds" or equivalent element. Such an element can specify the number of seconds between load (e.g., "ejb-Load") calls on a Read-Only entity bean. If read-timeout-seconds is set to zero, ejbLoad may only be called when the bean is brought into the cache.

A "concurrency-strategy" or similar element can be used to specify how a container should manage concurrent access to an entity bean. Concurrency-strategy can have, for example, values of "exclusive", "database", and "read-only". "Exclusive" can refer to an exclusive locking scheme. "Database" can refer to a scheme in which a separate entity bean instance is allocated for each transaction, while the locking and caching is handled by the database. "Read-only" can be used to specify read-only entity beans.

Certain other elements can be used, such as in a jar (java archive) file, to configure an entity bean to use application-level cache. These elements can include, for example, entity-cache-name, estimated-bean-size, max-beans-in-cache, idle-timeout-seconds, read-timeout-seconds, and concurrency-strategy. The estimated-bean-size element can be used if a developer wants to override the container's estimate of the average bean size.

The foregoing description of preferred embodiments of the present invention has been provided for the purposes of illustration and description. It is not intended to be exhaustive or to limit the invention to the precise forms disclosed.

Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A system for heterogeneous bean caching, comprising:
a bean having a primary key;
a cache capable of caching the bean;
a bean manager associated with the bean and the cache, the bean manager having a self-reference identifier; and
a key identifier for identifying the bean being cached in said cache, the key identifier comprising the primary key and the self-reference identifier.

2. A system according to claim 1, wherein:
the cache is further capable of caching additional beans associated with other bean managers.

3. A system according to claim 1, wherein:
the cache is further capable of managing the caching of the bean.

4. A system according to claim 1, wherein:
the bean has a life cycle, and said bean manager is further capable of managing the life cycle of said bean.

5. A system according to claim 1, wherein:
the bean manager is capable of creating the bean, storing the bean in the cache, loading the bean, and removing the bean from said cache.

6. A system according to claim 1, wherein:
the bean manager is further capable of making service requests on the cache.

7. A system according to claim 1, wherein:
the bean manager is further capable of providing the cache with the key identifier.

8. A system according to claim 1, wherein:
the key identifier comprises a Java class.

9. A method for heterogeneous bean caching, comprising:
generating a key identifier for a bean using the primary key of the bean and a self-reference identifier of a bean manager associated with the bean; and
using the key identifier to identify the bean in the cache.

10. A method according to claim 9, further comprising:
providing the key identifier to a cache for caching the bean.

11. A method according to claim 9, further comprising:
loading the bean into cache.

12. A system for heterogeneous bean caching, comprising:
a first bean manager capable of being associated with first beans of a first size on average;
a second bean manager capable of being associated with second beans of a second size on average;
a cache associated with the first bean manager and the second bean manager and being capable of caching the first beans and the second beans, the cache allocating cache memory for storing the first beans based on the first size and allocating cache memory for storing the second beans based on the second size.

13. A system according to claim 12, further comprising:
an interface allowing the specification of the first size and the second size.

14. A system according to claim 12, further comprising:
a deployment descriptor allowing the specification of the first size and the second size.

15. A method for heterogeneous bean caching, comprising:
specifying the average size of first beans to a cache;
specifying the average size of second beans to a cache; and
allowing the cache to allocate cache memory for the first beans based on the first size and to allocate cache memory for the second beans based on the second size.

16. A method according to claim 15, further comprising:
loading the first beans and the second beans into the cache.

17. A system for heterogeneous bean caching, comprising:
a bean adapted to hold a data instance;
a bean manager associated with the bean and capable of managing a life-cycle of the bean;
a cache associated with the bean manager and capable of caching the bean; and
a callback interface associated with the cache and allowing the cache to make callbacks on the bean manager related to the bean.

18. A system according to claim 17, wherein:
the cache is further adapted to send notification events related to the bean to the bean manager through the callback interface.

19. A system according to claim 17, wherein:
the cache contains no knowledge of the life-cycle of the bean.

20. The method of claim 15, further comprising:
using a bean manager to manage a life-cycle of the first beans stored in the cache.

21. The system of claim 1 wherein:
the bean has a life-cycle and the cache has no knowledge of the life-cycle of said bean.

22. The method of claim 9 wherein the bean has a life-cycle, and further comprising:
using the bean manager to manage the life-cycle of the bean stored in the cache.

23. The method of claim 22 wherein:
the cache has no knowledge of the life-cycle of the bean.

24. The system of claim 12, wherein:
the first beans have life-cycles and the second beans have life-cycles, and wherein the cache has no knowledge of the life-cycles of the first beans and of the second beans.

25. The system of claim 12 wherein:
the first beans have life-cycles and the second beans have life-cycles, and the first bean manager manages the life-cycles of the first beans and the second bean manage manages the life-cycles of the second beans.

26. The method of claim 15 wherein:
the first beans each have life-cycles and said cache has no knowledge of the life-cycles of the first beans.

* * * * *